US009239193B2

(12) United States Patent
Kadle et al.

(10) Patent No.: US 9,239,193 B2
(45) Date of Patent: Jan. 19, 2016

(54) UNITARY HEAT PUMP AIR CONDITIONER HAVING A HEAT EXCHANGER WITH AN INTEGRAL RECEIVER AND SUB-COOLER

(75) Inventors: Prasad S. Kadle, Williamsville, NY (US); Gary S. Vreeland, Medina, NY (US); Frederick V. Oddi, Orchard Park, NY (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 679 days.

(21) Appl. No.: 13/451,841

(22) Filed: Apr. 20, 2012

(65) Prior Publication Data

US 2012/0222846 A1   Sep. 6, 2012

Related U.S. Application Data

(63) Continuation-in-part of application No. PCT/US2012/025419, filed on Feb. 16, 2012, and a continuation-in-part of application No. 13/396,211, filed on Feb. 14, 2012.

(60) Provisional application No. 61/443,774, filed on Feb. 17, 2011.

(51) Int. Cl.
*F28F 3/00*   (2006.01)
*F28B 9/00*   (2006.01)
(Continued)

(52) U.S. Cl.
CPC ............ *F28B 9/005* (2013.01); *B60H 1/00342* (2013.01); *B60H 1/00899* (2013.01); *F25B 25/005* (2013.01); *F25B 39/04* (2013.01); *F25B 40/02* (2013.01); *F25B 2339/044* (2013.01)

(58) Field of Classification Search
CPC ........ F25B 40/02; F25B 39/04; F25B 25/005; F25B 2339/044; F28D 9/005; B60H 1/00899; B60H 1/00342; F28F 3/08
USPC ............ 165/167, 166, 164, 140; 62/507, 498, 62/509
See application file for complete search history.

(56) References Cited

U.S. PATENT DOCUMENTS 4,688,394 A   8/1987   Waldorf
5,289,698 A   3/1994   Garimella
(Continued)

FOREIGN PATENT DOCUMENTS

EP   0999078   1/2004
FR   2780490   6/1998

OTHER PUBLICATIONS

Valeo, Thermal Management—Ultimate Cooling: Solutions for Clean, Fuel Efficient & "Fun to Drive" Gas and Diesel Engines; Dr. De Pelsemaeker Georges; pp. 1-20.

*Primary Examiner* — Marc Norman
*Assistant Examiner* — Ana Vazquez
(74) *Attorney, Agent, or Firm* — Brinks Gilson & Lione

(57) ABSTRACT

The disclosure relates to a unitary heat pump air conditioner (Unitary HPAC) having a plate type hot-side heat exchanger assembly, a cold-side heat exchanger assembly, and electrically driven compressors and coolant pumps. The plate type hot-side heat exchanger assembly includes a plurality of plates stacked and hermetically sealed between an upstream end plate and a downstream end plate, defining a condenser/chiller portion having a first coolant passageway, a sub-cooler portion having a second coolant passageway, and a refrigerant receiver portion sandwiched between the condenser/chiller portion and the sub-cooler portion. The first coolant passageway and the second coolant passageway are in non-contact thermal communication with the refrigerant passageway.

13 Claims, 4 Drawing Sheets

(51) Int. Cl.
*F25B 25/00* (2006.01)
*F25B 39/04* (2006.01)
*F25B 40/02* (2006.01)
*B60H 1/00* (2006.01)

(56) References Cited

U.S. PATENT DOCUMENTS

| | | |
|---|---|---|
| 5,355,689 A | 10/1994 | Hara et al. |
| 5,704,229 A * | 1/1998 | Coakley et al. ............ 62/646 |
| 5,709,106 A * | 1/1998 | Inaba et al. ............ 62/507 |
| 5,988,267 A * | 11/1999 | Park et al. ............ 165/110 |
| 6,082,128 A | 7/2000 | Lake et al. |
| 6,230,508 B1 | 5/2001 | Baker et al. |
| 6,405,793 B1 | 6/2002 | Ghodbane et al. |
| 7,063,137 B2 | 6/2006 | Kadle et al. |
| 2006/0010887 A1* | 1/2006 | Lee ............ 62/93 |
| 2009/0107424 A1* | 4/2009 | Blassnitz et al. ............ 123/41.12 |
| 2011/0120162 A1* | 5/2011 | Ueda et al. ............ 62/228.1 |
| 2011/0213305 A1* | 9/2011 | Jonsson et al. ............ 604/113 |

* cited by examiner

UNITARY HEAT PUMP AIR CONDITIONER HAVING A HEAT EXCHANGER WITH AN INTEGRAL RECEIVER AND SUB-COOLER

CROSS-REFERENCE TO RELATED APPLICATION

This application is a continuation-in-part of International Application No. PCT/US2012/025419, filed on 16 Feb. 2012, which claims the benefit of U.S. Provisional Patent Application No. 61/443,774, filed 17 Feb. 2011.

This application is also a continuation-in-part of U.S. patent application Ser. No. 13/396,211, filed on 14 Feb. 2012, which claims the benefit of U.S. Provisional Patent Application No. 61/443,774, filed 17 Feb. 2011.

Each of International Application No. PCT/US2012/025419, U.S. patent application Ser. No. 13/396,211, and U.S. Provisional Patent Application No. 61/443,774 is hereby incorporated by reference in its entirety.

TECHNICAL FIELD OF INVENTION

The present disclosure relates to a heating and air-conditioning system for an automotive vehicle; particularly, to a heat pump air-conditioning system; still more particularly, to a heat exchanger for a heat pump air-conditioning system.

BACKGROUND OF INVENTION

For the comfort of the occupants in the passenger compartment, motor vehicles typically include dedicated air-conditioning systems and heating systems. The heating system includes a heater core located inside a heating, ventilating, and air conditioning (HVAC) module of the vehicle. The heater core is typically a liquid-to-air heat exchanger that supplies thermal energy to the passenger compartment for comfort heating. A heat transfer liquid, such as a glycol based coolant, conveys waste heat from an internal combustion engine to the heater core where the thermal energy from the heat transfer liquid is transferred to the ambient air flowing through the heater core to the passenger compartment. With the advent of greater efficiency internal combustion engines, hybrid vehicles having smaller internal combustion engines, and especially electrically driven vehicles, the amount of thermal energy available to provide comfort to occupants in the passenger compartment may not be adequate.

To provide supplemental heat to the passenger compartment for vehicles having smaller internal combustion engines, it is known to operate the air-conditioning system in heat pump mode. A typical motor vehicle air-conditioning system includes an evaporator located in the HVAC module and a condenser located in the front engine compartment exposed to outside ambient air. A compressor circulates a two-phase refrigerant through the evaporator where it expands into a low pressure vapor refrigerant by absorbing heat from the passenger compartment. After the low pressure vapor is compressed to a high pressure vapor by the compressor, the vapor phase refrigerant is transferred to the condenser where the high pressure vapor is condensed into a high pressure liquid refrigerant by releasing the heat to the ambient air. The liquid phase is returned to the evaporator through an expansion device which converts the high pressure liquid refrigerant to a low pressure mixture of liquid and vapor refrigerant to continue the cycle. By operating the air-conditioning system in heat pump mode, the refrigerant flow is reversed, in which case the condenser absorbs heat from the outside ambient air by evaporating the liquid phase refrigerant and the evaporator releases the heat to the passenger compartment by condensing the vapor phase refrigerant. One disadvantage to operating the air-conditioning system in heat pump mode, since the low pressure side of the system when used in air conditioning mode would become the high pressure side when used in heat pump mode, is the increase in system complexity due to the requirement of having to reinforce the refrigerant plumbing throughout the system by using thicker gage tubing and fittings. There is also the need to reinforce the evaporator to withstand the high pressure refrigerant, and to install an additional expansion device and receiver together with additional associated plumbing. Another known disadvantage of operating the system in heat pump mode is that in cooler climates, as the surface temperature of the condenser drop below 32° F., any moisture condensed on the surface of the condenser is subject to freezing, therefore resulting in reduced efficiency of the system and even potentially damaging the condenser.

Electric heaters are known to be used to provide supplemental heat to the passenger compartment for vehicles using the air-conditioning system as a heat pump. In the coldest of climates, it is known that operating the air-conditioning system in heat pump mode is ineffective; therefore, additional electric heaters are required. However, for hybrid and electrical vehicles, electrical heaters represent an increased current draw that significantly reduces the electric drive range.

Based on the foregoing, there is need for a heating system that provides supplementary heat to the passenger compartment of a motor vehicle that does not require reversing the refrigerant cycle of the air-conditioning system or detrimentally impact the electric driving range.

SUMMARY OF THE INVENTION

The present invention relates to Unitary Heat Pump Air Conditioner (Unitary HPAC) for a Unitary HPAC System. The Unitary HPAC includes a hot-side heat exchanger assembly having a plurality of plates stacked and hermetically sealed between an upstream end plate and a downstream end plate. The plurality of stacked plates define a condenser/chiller portion adjacent the upstream end plate, a sub-cooler portion adjacent the downstream end plate, and a refrigerant receiver portion sandwiched between the condenser/chiller portion and the sub-cooler portion. The upstream end plate includes a refrigerant inlet and a hot coolant outlet, and the downstream end plate includes a refrigerant outlet, a hot coolant inlet, a sub-cooler coolant inlet and a sub-cooler coolant outlet.

The hot-side heat exchanger assembly includes a refrigerant passageway in hydraulic communication with the refrigerant inlet and the refrigerant outlet, a first coolant passageway in hydraulic communication with the hot coolant inlet and the hot coolant outlet, and a second coolant passageway in hydraulic communication with the sub-coolant inlet and the sub-coolant outlet. The first coolant passageway and the second coolant passageway are in non-contact thermal communication with the refrigerant passageway.

The unitary HPAC may include a cold-side heat exchanger assembly having a refrigerant inlet in hydraulic communication with the refrigerant outlet of hot-side heat exchanger assembly and a refrigerant outlet in hydraulic communication with the refrigerant inlet of hot-side heat exchanger assembly. The unitary HPAC may further include an electrically driven compressor for circulating a refrigerant through the cold-side heat exchanger assembly and the hot-side heat exchanger assembly such that heat energy is transferred from the cold-side heat exchanger assembly to the hot-side heat exchanger assembly, an electrically driven hot side coolant pump in hydraulic communication with the coolant inlet of hot-side heat exchanger assembly, and an electrically driven cold side coolant pump in hydraulic communication with a coolant inlet of the cold-side heat exchanger assembly.

An embodiment of the invention provides a Unitary HPAC that is compact and easily installed in virtually any compartment of a vehicle that is about the size a typical bread box. In vehicles with small efficient internal combustion engines, the Unitary HPAC scavenges heat from waste heat sources, such as the vehicle electronics, and use the waste heat to supplement the heating needs of the passenger compartment. In hybrid and electric vehicles, the Unitary HPAC improves the driving ranges in cold climates by minimizing the use of electric current to power electric heaters and providing heat to the battery packs to maintain an optimal operating temperature. Further features and advantages of the invention will appear more clearly on a reading of the following detailed description of an embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Referring to FIG. 1 through FIG. 4, wherein like numerals indicate corresponding parts throughout the several views, is a Unitary Heat Pump Air Conditioner (Unitary HPAC) System 10 and an embodiment of a Unitary HPAC 100 for use in a motor vehicle. The motor vehicle may be that of one with an internal combustion engine, a hybrid vehicle having both an internal combustion engine and an electric drive, or that of an electric vehicle having an electric drive. The Unitary HPAC System 10 includes a Unitary HPAC 100 that is compact and easily installed in virtually any compartment of the vehicle that is about the size of a bread box or larger. Further advantages of the Unitary HPAC System 10 will be readily appreciated by the reading of the disclosure below.

Figure 1:
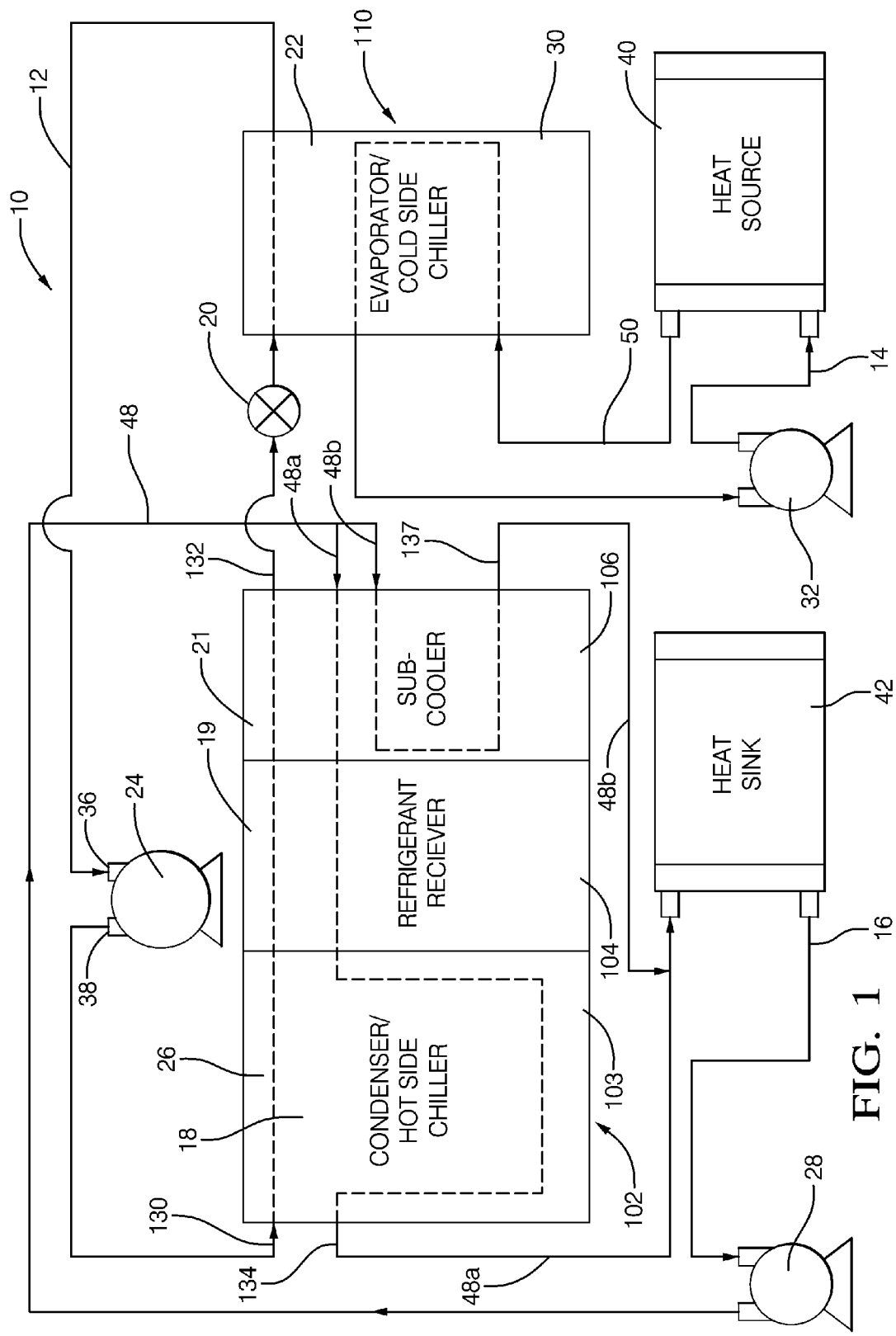
FIG. 1 a schematic flow diagram for a Unitary Heat Pump Air Conditioner (Unitary HPAC) System having a Unitary HPAC in accordance with the invention.

Shown in FIG. 1 is flow schematic of the Unitary HPAC System 10 having a dedicated refrigerant loop 12 in thermal communication with a cold coolant loop 14 and a hot coolant loop 16. The cold coolant loop 14 conveys waste heat energy away from a heat source 40 within the vehicle, such as the waste heat from the internal combustion engine or electronics, thereby cooling the heat source 40. The refrigerant loop 12 transfers the heat energy from the cold coolant loop 14 to the hot coolant loop 16, which in turn conveys the heat energy to a heat sink 42, such as an occupant heat exchanger to provide supplemental heat to the passenger compartment. In essence, the Unitary HPAC System 10 effectively captures waste heat energy from one part of the vehicle and puts it to beneficial use within another part of the vehicle. As an alternative, the heat sink 42 may be a radiator type heat exchanger exposed to the outside ambient air where the waste heat is dissipated to the external environment. The flow paths of the cold and hot coolant loops 14, 16 throughout the vehicle may be reconfigured based on the cooling and heating needs of the vehicle. The cold and hot coolant loops 14, 16 may include a myriad of interconnecting branches with remotely activated valves at strategic nodes that may be reconfigured to redefine the flow paths of the cold and hot coolant loops 14, 16 to selectively provide cold or hot coolant flows to multiple designated heat sources 40 or heat sinks 42, respectively.

The refrigerant loop 12 includes a condenser 18, a refrigerant receiver 19, a sub-cooler 21, a refrigerant expansion device 20, and an evaporator 22 hydraulically connected in series. At the heart of the refrigerant loop is a refrigerant compressor 24 located downstream of the evaporator 22 and upstream of the condenser 18. The compressor 24 is responsible for compressing and transferring a two-phase refrigerant, such as R-134a or R-1234yf, throughout the refrigerant loop 12 of the Unitary HPAC System 10. The compressor cycles the refrigerant through the refrigerant loop 12 to transfer heat energy from the cold coolant loop 14, which includes a cold side chiller 30, to the hot coolant loop 16, which includes a hot side chiller 26. For illustrative purposes, the hot side chiller 26 and cold side chiller 30 may be that of a water or coolant jacket encasing the condenser 18 and evaporator 22, respectively, or may be part of a plate-type heat exchanger assembly, which is disclosed in greater detail below.

The refrigerant cycle of the refrigerant loop 12 is typically the same as that of a dedicated air conditioning system of a motor vehicle operating in cooling mode. A two phase refrigerant is circulated through the refrigerant loop 12 by the compressor 24, which includes a suction side 36, also referred to as the low pressure side, and a discharge side 38, also referred to as the high pressure side. The suction side of the compressor receives a low pressure vapor phase refrigerant from the evaporator 22, after absorbing heat from the cold coolant loop 14 by way of the cold side chiller 30, and compresses it to a high pressure vapor phase refrigerant, which is then discharged to the condenser 18. As the high pressure vapor phase refrigerant is condensed to a high pressure liquid phase refrigerant in the condenser 18, heat is transferred to the hot coolant loop 16 by way of the hot side chiller 26. Exiting the condenser 18, the high pressure liquid phase refrigerant passes through the refrigerant receiver 19 to separate any refrigerant vapor, the sub-cooler 21 to further cool the liquid phase refrigerant, and then to the refrigerant expansion device 20, through which the refrigerant begins to expand into a mixture of a bubbling gas-liquid phase. The bubbling gas-liquid phase refrigerant enters the evaporator 22 and continues to expand into the low pressure vapor refrigerant by absorbing heat from the cold coolant loop 14. The low pressure high quality/superheated vapor refrigerant is then cycled back to the suction side 36 of the compressor 24 to repeat the process.

The cold coolant loop 14 includes the cold side chiller 30 in non-contact thermal communication with the evaporator 22 and a cold side coolant pump 32 that circulates a cold side coolant 50 through the cold side chiller 30. As the refrigerant expands within the evaporator 22, heat energy is transferred from the cold coolant loop 14 to the refrigerant loop 12.

The hot-coolant loop 16 includes the hot side chiller 26 in non-contact thermal communication with the condenser 18 and a hot side coolant pump 28 that circulates a hot side coolant 48 through the hot side chiller 26. The hot side coolant 48 flowing in the hot-coolant loop 16 is split into a first portion hot side coolant 48a and a second portion hot side coolant 48b. The hot side coolant pump 28 circulates the first portion hot side coolant 48a through the hot side chiller 26 and the second portion of the hot side coolant 48b through the sub-cooler 21. The first portion hot side coolant 48a flows directly through both the sub-cooler 21 and receiver 19 into the hot-side chiller 26, within which heat energy is transferred from the higher temperature refrigerant to the lower temperature first portion of the hot side coolant 48. The heated first portion hot side coolant 48a exits the hot-side chiller 26 into the heat sink 42. The second portion hot side coolant 48b flows through the sub-cooler 21 to further cool the liquid phase refrigerant. After exiting the sub-cooler 21, the second portion hot side coolant 48b joins the first portion of the hot side coolant 48a before flowing into the heat sink 42.

Figure 2:
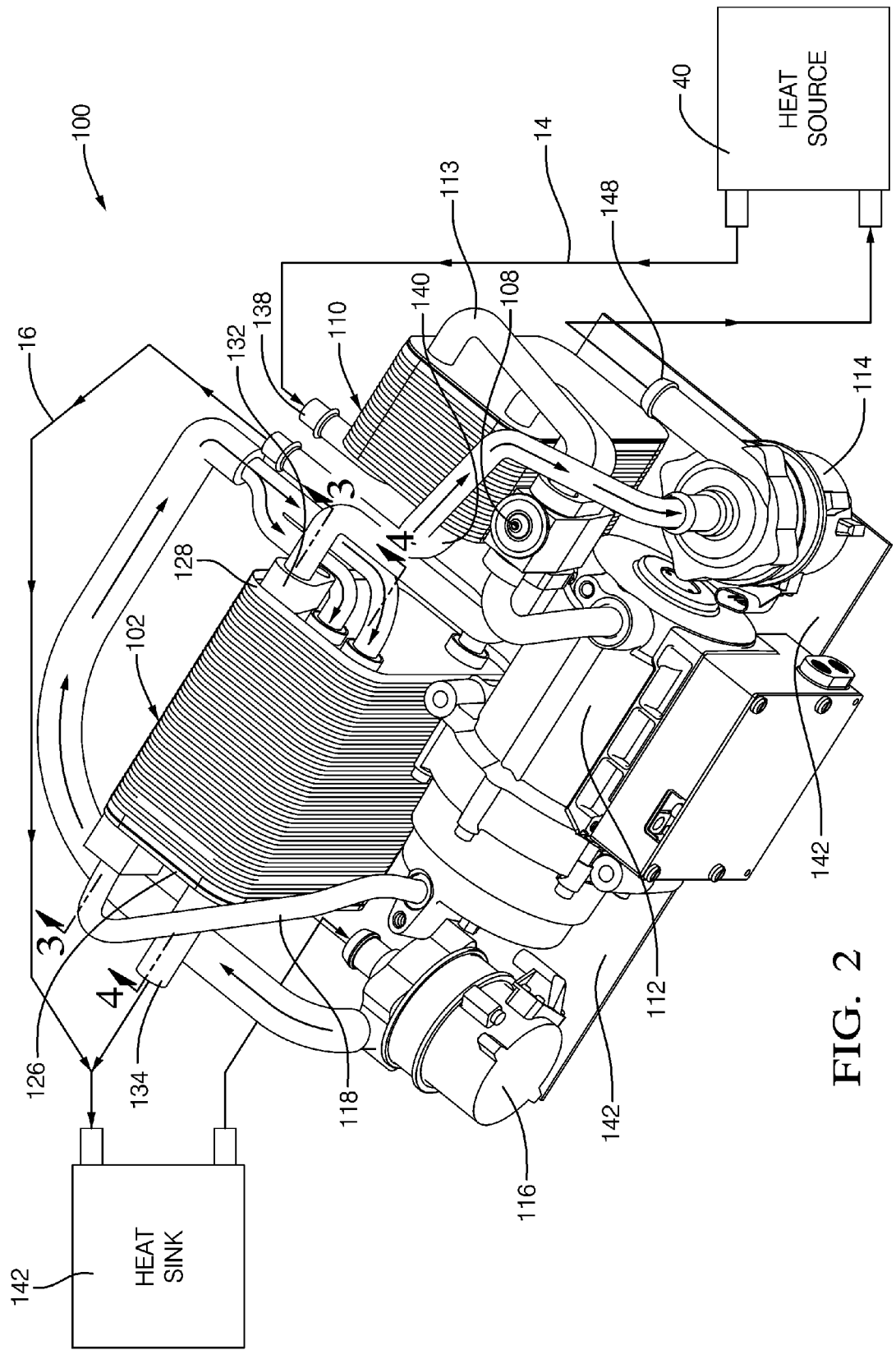
FIG. 2 shows an embodiment of the Unitary HPAC in accordance with the invention.
Figure 3:
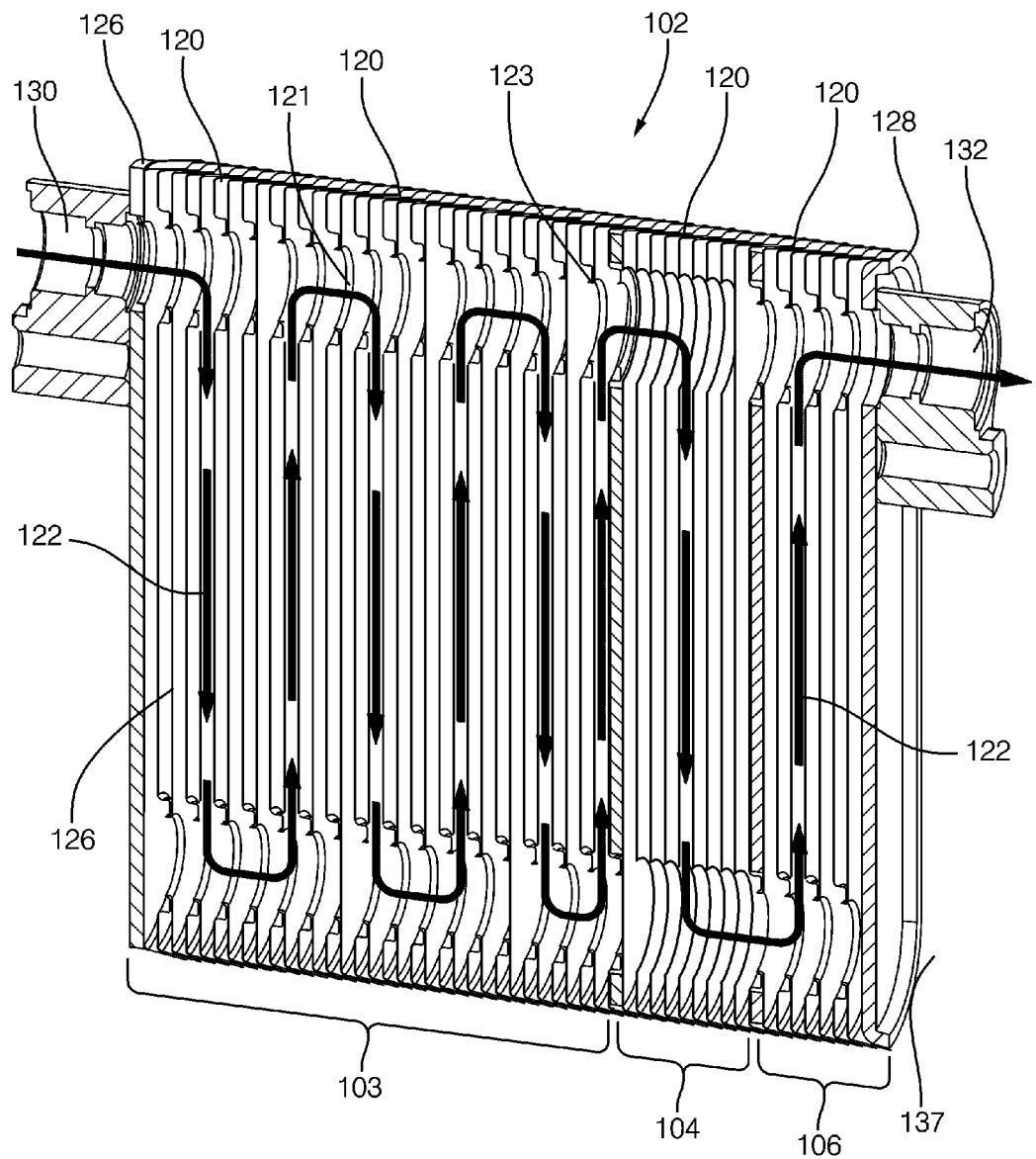
FIG. 3 is a cross-section of the hot-side heat exchanger assembly of FIG. 2 having an integral condenser/chiller portion, receiver portion, and sub-cooler portion taken along lines 3-3 showing the path of refrigerant flow.
Figure 4:
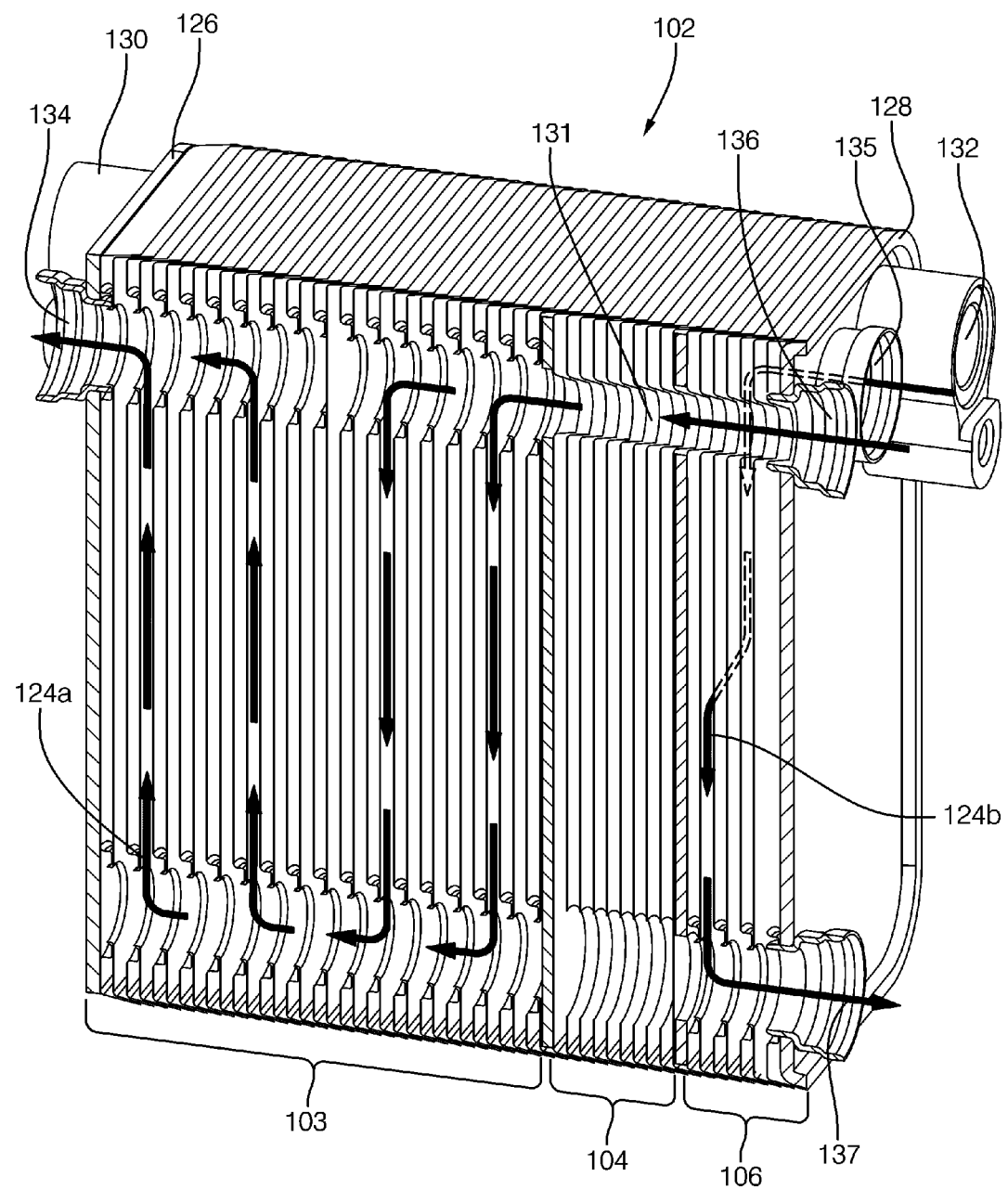
FIG. 4 is a cross-section of the hot-side heat exchanger assembly of FIG. 2 taken along lines 4-4 showing the path of the hot-side coolant flow.

With reference to FIGS. 2, 3, and 4, an embodiment of the invention includes an integrated hot-side heat exchanger assembly 102 having a condenser/chiller portion 103, a receiver portion 104, and a sub-cooler portion 106 manufactured from a plurality of stamped metal plates. The integrated hot-side heat exchanger assembly 102 may also include an internal heat exchanger (IHX) as disclosed in U.S. patent application Ser. No. 13/396,211. An embodiment of the invention may also include a cold-side heat exchanger assembly 110 having an integral evaporator/chiller portion also manufactured from a plurality of stamped metal plates.

Shown in FIG. 2 is an exemplary compact Unitary HPAC 100 in accordance with an embodiment of the invention. The Unitary HPAC 100 shown includes a hot-side heat exchanger assembly 102, a refrigerant expansion device such as a thermal expansion valve (TXV) 108, and a cold-side heat exchanger assembly 110. The Unitary HPAC 100 also includes an electrically driven compressor 112 for the circulation of a typical two-phase refrigerant through a series of refrigerant tubes 113 and electrically driven cold side and hot side coolant pumps 114, 116 configured to hydraulically connect to the cold coolant loop and hot coolant loop 14, 16, respectively. The compressor 112 may be that of a compact scroll compressor driven by a permanent magnet motor with neodymium magnets. The liquid coolant used in the hot and coolant loops is generally a mixture of 70% glycol-30% water, which prevents the coolant from freezing or becoming too viscous at the low temperatures needed in the cold-side heat exchanger assembly 110.

Shown in FIGS. 3 and 4 are cross-sections of the hot-side heat exchanger assembly 102 of FIG. 2 taken along line 3-3 and line 4-4, respectively. The hot-side heat exchanger assembly 102 may be that of a plate-type heat exchanger assembly having a plurality of stamped metal plates 120 stacked and brazed between an upstream end plate 126 and a downstream end plate 128, with respect to the direction of refrigerant flow, to define a condenser/chiller portion 103, a receiver portion 104, and a sub-cooler portion 106. The upstream end plate 126 includes a refrigerant inlet 130 and a hot coolant outlet 134. The downstream end plate 128 includes a refrigerant outlet 132, a hot coolant inlet 136, a sub-cooler hot coolant inlet 135, and a sub-cooler hot coolant outlet 137. The stamped metal plates include features known to those of ordinary skill in the art, such as openings 121, bosses 123 about selected openings 121, and flanges 125, which when stacked, define a tortuous refrigerant passageway 122 for high pressure refrigerant flow from the refrigerant inlet 130 to the refrigerant outlet 132. The stacked plates also define a hot coolant header 131 that extends from the hot-coolant inlet 135 through both the sub-cooler portion 106 and receiver portion 104, a first hot coolant passageway 124a through the condenser/chiller portion 103 in fluid communication with the hot coolant header 131 and hot coolant outlet 134, and a second hot coolant passageway 124b through the sub-cooler portion 106 in fluid communication with the sub-cooler hot coolant inlet 135 and sub-cooler hot coolant outlet 137. The plates 120 may include numerous contact points established between adjacent plates to induce turbulence to the fluids flowing therethrough to provide a high heat transfer co-efficient.

The flows of the hot refrigerant and hot coolants through the hot-side heat exchanger assembly 102 are in non-contact thermal communication; in other words, the hot coolants 48a, 48b and refrigerant are not intermingled, but are in thermal communication with each other. Heat energy from the higher temperature refrigerant is transferred to the lower temperature hot coolants 48a, 48b, thereby increasing the temperature of the hot coolant 48 as it leaves the hot-side heat exchanger assembly 102 returning to the hot coolant loop 16.

Shown in FIG. 3 is the flow path of the refrigerant passageway 122 through the hot-side heat exchanger assembly 102. The high pressure vapor refrigerant enters the refrigerant inlet 130, flows through the tortuous refrigerant passageways 122 within the condenser/chiller portion 103 and condenses into a liquid phase refrigerant as heat is transferred from the hotter refrigerant to the cooler hot-coolant flow. The substantially liquid phase refrigerant exits the condenser/chiller portion 103, enters the top of the receiver portion 104 and then exits the bottom of the receiver portion 104 in the sub-cooler portion 106, with respect to the direction of gravity. The vapor phase refrigerant remains within the top portion of the receiver portion 104, while the liquid phase refrigerant flows through the refrigerant passageway 122 within the sub-cooler portion 106 before exiting through the refrigerant outlet 132 to the TXV 108.

Shown in FIG. 4 is the flow path of the first and second hot coolant passageways 124a, 124b through the hot-side heat exchanger assembly 102. The hot side coolant pump 116 circulates a first portion hot side coolant 48a through the condenser/chiller portion 103 and a second portion side coolant 48b through the sub-cooler portion 106. The first portion hot side coolant 48a enters the hot coolant inlet 136 and flows through the hot coolant header 131 directly into the condenser/chiller portion 103. The heated first portion hot side coolant 48a exits the condenser/chiller portion 103 into the heat sink 142. The second portion hot side coolant 48b flows through the second hot coolant passageway 124b within the sub-cooler portion 106 and joins the first portion hot side coolant 48a before flowing into the heat sink 142.

Similarly, the integral cold-side heat exchanger assembly 110 may also be plate-type heat exchangers. The integral cold-side heat exchanger assembly 110 includes a cold coolant inlet 138 and outlet 140, an evaporator refrigerant passageway for low pressure refrigerant flow, and a separate cold coolant passageway for cold coolant flow. The flows of the low pressure refrigerant and cold coolant through the integral cold-side heat exchanger assembly 110 are also in non-contact thermal communication with each other, and may be concurrent or countercurrent flow. Heat energy from the higher temperature cold coolant is transferred to the lower temperature evaporating refrigerant, thereby decreasing the temperature of the cold coolant as it leaves the integral cold-side heat exchanger assembly 110 and returning to the cold coolant loop 14.

Referring back to FIG. 2, unlike a traditional air conditioning system, where the refrigerant side components are remotely dispersed throughout the engine bay and within the HVAC module, the components of the Unitary HPAC 100 including the hot-side heat exchanger assembly 102, TXV 108, integral cold-side heat exchanger assembly 110, and electrically driven compressor 112 and coolant pumps 114, 116 may be all mounted onto a single platform 142 measuring approximately 420 mm by 290 mm. The components may be enclosed a housing, having a similar sized base and a height of about less than 190 mm, which is approximately the size of a typical bread box, for ease of handling and protection against the environment. The centralized location of the components that form the Unitary HPAC 100 allows the use of shorter length refrigerant tubes 113 which are manufactured from a refrigerant impermeable material, such as stainless steel, aluminum, and/or copper. The shorten length refrigerant impermeable tubes 113 minimizes refrigerant leaks and moisture infiltration; thereby allowing the use of a smaller volume receiver portion 104, since a large volume of reserve refrigerant is not required. The reduction of moisture infiltration reduces or eliminates the volume of desiccant needed, resulting in a more compact Unitary HPAC 100. Due to its compact size, the Unitary HPAC 100 may be installed in virtually any location within the body of a motor vehicle that can fit a bread box, such as within the trunk, under the hood, within the dashboard, or even under the seats.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the intentions without departing from the essential scope thereof. Therefore, it is intended that the invention not be limited to the particular embodiment disclosed as the best mode contemplated for carrying out this invention, but that the invention will include all embodiments falling within the scope of the appended claims.

Having described the invention, it is claimed:

1. A unitary heat pump air conditioner, comprising:
   a hot-side heat exchanger assembly having a plurality of plates stacked and hermetically sealed between an upstream end plate and a downstream end plate, defining: a condenser/chiller portion adjacent said upstream end plate, wherein said upstream end plate includes a refrigerant inlet and a hot coolant outlet;
   a sub-cooler portion adjacent said downstream end plate, wherein said downstream end plate includes a refrigerant outlet, a hot coolant inlet, a sub-cooler coolant inlet and a sub-cooler coolant outlet;
   a refrigerant passageway in hydraulic communication with said refrigerant inlet and said refrigerant outlet, wherein said refrigerant passageway extends through said condenser/chiller portion and said sub-cooler portion;
   a first coolant passageway in hydraulic communication with said hot coolant inlet and said hot coolant outlet, wherein said first coolant passageway extends through said condenser/chiller portion; and
   a second coolant passageway in hydraulic communication with said sub-coolant inlet and said sub-coolant outlet, wherein said second coolant passageway extends through said sub-cooler portion;
   wherein said first coolant passageway and said second coolant passageway are in non-contact thermal communication with said refrigerant passageway,
   wherein said unitary heat pump air conditioner forms a unitary subassembly having a compact size suited for installation in at least one of the following locations in a passenger vehicle: a vehicle trunk, under a vehicle hood, within a vehicle dashboard, or under vehicle seats.

2. The unitary heat pump air conditioner of claim 1, wherein said hot-side heat exchanger assembly further defines a refrigerant receiver portion sandwiched between said condenser/chiller portion and said sub-cooler portion, wherein said refrigerant passageway extends through said refrigerant receiver portion.

3. The unitary heat pump air conditioner of claim 2, wherein said refrigerant passageway meanders through at least one of said condenser/chiller portion, said receiver portion, and said sub-cooler portion.

4. The unitary heat pump air conditioner of claim 3, wherein said refrigerant passageway enters top portion of said receiver portion from said condenser/chiller portion and exits bottom portion of said receiver portion to said sub-cooler portion.

5. The unitary heat pump air conditioner of claim 2, wherein said plurality of stacked plates of hot-side heat exchanger assembly further defines a first coolant header extending linearly through both said receiver portion and sub-cooler portion, and in hydraulic communication with said first coolant passageway extending through said condenser/chiller portion and said hot coolant inlet.

6. The unitary heat pump air conditioner of claim 5, wherein said first hot coolant passageway meanders through said condenser/chiller portion.

7. The unitary heat pump air conditioner of claim 5, wherein said second hot coolant passageway meanders through said sub-cooler portion.

8. The unitary heat pump air conditioner of claim 5, wherein said first hot coolant passageway is in non-contact counter-flow with said refrigerant passageway.

9. The unitary heat pump air conditioner of claim 3, further comprising:
   a cold-side heat exchanger assembly having a refrigerant inlet in hydraulic communication with said refrigerant outlet of hot-side heat exchanger assembly and a refrigerant outlet in hydraulic communication with said refrigerant inlet of hot-side heat exchanger assembly; and
   an electrically driven compressor for circulating a refrigerant through said cold-side heat exchanger assembly and said hot-side heat exchanger assembly such that heat energy is transferred from said cold-side heat exchanger assembly to said hot-side heat exchanger assembly.

10. The unitary heat pump air conditioner of claim 9, further comprising an electrically driven hot side coolant pump in hydraulic communication with said coolant inlet of hot-side heat exchanger assembly and an electrically driven cold side coolant pump in hydraulic communication with a coolant inlet of said cold-side heat exchanger assembly.

11. A plate type hot-side heat exchanger assembly for a unitary heat pump air conditioner, comprising:
   a plurality of plates stacked and hermetically sealed between an upstream end plate and a downstream end plate, defining:
   a condenser/chiller portion adjacent said upstream end plate, wherein said upstream end plate includes a refrigerant inlet and a hot coolant outlet;
   a sub-cooler portion adjacent said downstream end plate, wherein said downstream end plate includes a refrigerant outlet, a hot coolant inlet, a sub-cooler coolant inlet and a sub-cooler coolant outlet;
   a refrigerant receiver portion sandwiched between said condenser/chiller portion and said sub-cooler portion;
   a refrigerant passageway in hydraulic communication with said refrigerant inlet and said refrigerant outlet; wherein said refrigerant passageway extends through said condenser/chiller portion and said sub-cooler portion;

a first coolant passageway in hydraulic communication with said hot coolant inlet and said hot coolant outlet; and a second coolant passageway in hydraulic communication with said sub-coolant inlet and said sub-coolant outlet;

wherein said first coolant passageway and said second coolant passageway are in non-contact thermal communication with said refrigerant passageway, wherein the plate type hot-side heat exchanger has a size suited for installation within a unitary heat pump air conditioner that forms a unitary subassembly suited for installation win at least one of the following locations in a passenger vehicle: a vehicle trunk, under a vehicle hood, within a vehicle dashboard, or under vehicle seats.

12. The plate type hot-side heat exchanger assembly for a unitary heat pump air conditioner of claim 11, wherein said refrigerant passageway enters top portion of said receiver portion from said condenser/chiller portion and exits bottom portion of said receiver portion to said sub-cooler portion.

13. The plate type hot-side heat exchanger assembly for a unitary heat pump air conditioner of claim 12, further comprising a first coolant header extending linearly through both said receiver portion and sub-cooler portion, and in hydraulic communication with said first coolant passageway extending through said condenser/chiller portion and said hot coolant inlet.

* * * * *